United States Patent [19]

Doelves et al.

[11] Patent Number: 4,688,101

[45] Date of Patent: Aug. 18, 1987

[54] METHOD FOR ENGRAVING PRINTING CYLINDERS HAVING SEAMLESS JOINTS WITHIN REPEATED PATTERNS

[75] Inventors: Juergen Doelves, Heikendorf; Wolfgang Schroedter, Kiel, both of Fed. Rep. of Germany

[73] Assignee: Dr.-Ing. Rudolf Hell GmbH, Fed. Rep. of Germany

[21] Appl. No.: 857,763

[22] PCT Filed: Jul. 11, 1985

[86] PCT No.: PCT/DE85/00239

§ 371 Date: Mar. 7, 1986

§ 102(e) Date: Mar. 7, 1986

[87] PCT Pub. No.: WO 86/00770

PCT Pub. Date: Jan. 30, 1986

[30] Foreign Application Priority Data

Jul. 12, 1984 [DE] Fed. Rep. of Germany ....... 3425626

[51] Int. Cl.$^4$ .......................... H04N 1/21; H04N 1/40
[52] U.S. Cl. ..................................... 358/299; 358/280; 358/296
[58] Field of Search .............. 358/299, 296, 280, 289, 358/287, 75, 78, 80; 178/6.6, 6.7

[56] References Cited

U.S. PATENT DOCUMENTS

| 3,965,289 | 6/1976 | Pugsley | 178/6 |
| 4,054,916 | 10/1977 | Knop | 358/284 |
| 4,422,101 | 12/1983 | Takei | 358/299 |
| 4,500,929 | 2/1985 | Buechler | 358/299 |

FOREIGN PATENT DOCUMENTS

1400806 7/1975 United Kingdom.

Primary Examiner—E. A. Goldberg
Assistant Examiner—Linda M. Peco
Attorney, Agent, or Firm—Hill, Van Santen, Steadman & Simpson

[57] ABSTRACT

A method for producing printing cylinders for seamless or endless patterns with printing form engraving machines having a scan cylinder and an engraving cylinder. A pattern original on the scan cylinder is opto-electronically scanned picture-element-wise along scan lines lying next to one another which run in a circumferential direction of the scan cylinder, and where every scan line supplies the information for an engraving line of a pattern repeat to be transmitted onto the printing cylinder. The scan original is longer than the pattern repeat (original extension). In a mixing region, picture elements of the original extension and of the beginning of the original stored for every scan line are combined in accordance with a prescribed mixing function to form picture elements having a new density information. For engraving of the printing cylinder, the overall repeat is formed from the picture elements deriving from this mixing and the unaltered picture elements following from the end of the mixing region up to the end of the pattern repeat of the lines.

7 Claims, 11 Drawing Figures

METHOD FOR ENGRAVING PRINTING CYLINDERS HAVING SEAMLESS JOINTS WITHIN REPEATED PATTERNS

BACKGROUND OF THE INVENTION

The present invention relates to a method for producing printing cylinders for seamless or endless patterns with printing form engraving machines having scanning and engraving cylinders. A pattern original on the scan cylinder is opto-electronically scanned picture-element-wise along scan lines positioned next to one another which proceed in a circumferential direction of the scan cylinder, and wherein every scan line supplies the information for an engraving line of a pattern repeat to be transferred to the engraving cylinder.

Printing form engraving machines are in use in printing technology with which printing forms are engraved for printing seamless and endless patterns. An example of such endless patterns is a wood decoration for the manufacture of which a printing form comprising an endless pattern is employed. Pattern originals which are produced, for example, by photographing a real wood pattern and by subsequent retouch are employed for the production of such patterns. A difficulty in the reproduction of the pattern is to make the seam between beginning and end of the pattern disappear, because a joint is immediately perceptible to the eye in the endless pattern. For this purpose, the original is retouched at a beginning and at an end so that an optimally uniform transition between the decorative path at the beginning and end of the pattern or of the original should occur. Nonetheless, the seam in the final printed product is usually still perceptible in this technique. For the suppression of remaining residual seams, for example, it is known from the German Pat. No. 16 52 340 and from the German OS No. 31 29 649, both incorporated herein, to produce the pattern original such that it is longer than the pattern repeat, whereby the length of the basic pattern is referred to as pattern repeat.

In the German Pat. No. 16 52 340, the change-over location, i.e. the joint, is displaced into the pattern beginning and into the pattern extension. An improvement thus arises in comparison to the simple case wherein pattern beginning and end follow one another, and the transition at the joint is to be avoided only by means of retouching the pattern beginning and end. In many cases, however, the seam nonetheless remains perceptible since, for example, wood grows irregularly as a natural product and the grains at the pattern beginning and end often deviate too greatly from one another for this deviation to be completely eliminated by retouching.

In the German OS No. 31 29 649, the image signals in the original scan which are acquired by scanning that part of the original proceeding beyond the pattern repeat are mixed with the image signals acquired by the scan of the beginning of the original. They are mixed in a mixing region by a computer for generating a steady transition between the signal level at the beginning of the pattern repeat and the signal level at the end of the pattern repeat. Although a steady transition occurs here, since the mixing region always begins at the beginning of the original and has a prescribed length, a strip nonetheless arises in the pattern printed with such a printing form. This strip deviates from the remaining pattern in terms of its pattern structure and is perceived by the eye as a disturbance repeating after every repeat.

These individual techniques which have been proposed in fact yield improvements in the pattern matching but the result in the individual methods is not satisfactory.

SUMMARY OF THE INVENTION

It is therefore an object of the present invention to specify a method for producing printing cylinders for seamless or endless patterns with printing form engraving machines wherein the perceptibility of the pattern transition from pattern beginning to pattern end is entirely avoided in the reproduction of a repeating decor.

According to the invention, a method is provided for the production of a printing cylinder for seamless or endless patterns by printing form engraving machines having a scan cylinder and an engraving cylinder. A pattern original on the scan cylinder is opto-electronically scanned picture-element-wise along scan lines lying next to one another which proceed in a circumferential direction of the scan cylinder. Every scan line supplies information for an engraving line of a pattern repeat to be transferred onto the printing cylinder. The pattern original being scanned is provided such that it is longer than the pattern repeat. Image signals acquired by scanning a portion of the original extending beyond the pattern repeat are mixed with image signals acquired by scanning a beginning of the original. The image signals are mixed in a prescribable mixing region for generating a steady transition between signals at a beginning of the pattern repeat and signals at an end of the pattern repeat. Starting points for scanning individual scan lines of the original are shifted by different amounts at the beginning of the original in a direction of the scan lines and at a beginning of the mixing region extending from the respective starting point in a circumferential direction of a scan cylinder. A control mask is provided which has a width of the original, has an uneven-lined contour gradation over its width, and has a line guidance corresponding to a most favorable seam progression. The contour gradation of the control mask is shifted relative to the beginning of the original and defines the beginning of the mixing region. In a same fashion as the original, the mask is electronically scanned along scan lines lying next to one another. A signal of each and every mask scan line appearing at a contour of the mask defines the starting point of the respective scan line of the original in combination with a mask recognition signal. Proceeding from the starting point of the scan lines, a same number of picture elements of the original are scanned and stored on every image line of the original as corresponds to the pattern repeat. The scanning of the original continues from the end of the pattern repeat for every scan line of the original into an extension of the original for a distance corresponding to a length of the mixing region. Picture element signals thereby acquired are stored. In the mixing region, the stored picture element signals of the original extension and of the beginning of the original for every scan line are combined in accordance with a prescribed mixing function to form picture element signals having a new density information. For engraving the printing cylinder, forming an overall repeat from the picture element signals resulting from mixing unaltered picture element signals following thereupon from an end of the mixing region up to the end of the pattern repeat.

DESCRIPTION OF THE PREFERRED EMBODIMENTS

The implementation of the present invention proceeds on the basis of a printing form engraving machine as disclosed, for example, in German Pat. No. 25 08 734 which corresponds to U.S. Pat. No. 4,013,839, incorporated herein. In this patent, an original on the scan cylinder of the engraving machine is optoelectronically scanned picture-element-wise along scan lines disposed next to one another which proceed in a circumferential direction of the scan cylinder, and the length of a scan line of the original corresponds to the length of an engraving line on the engraving cylinder. In this engraving machine which operates with an intermediate storage of the scan lines, the length of the scan line is adapted to the length of the engraving line on the engraving cylinder with a scaling electronics disclosed therein by means of different memory input and read-out rates. For this purpose, every scan line is written into a memory proceeding from its beginning, i.e. proceeding from the image line start. This memory has a sufficient number of memory locations such that the longest scan line can be accepted. The roll-in occurs such that, proceeding from the image line start, the successive picture elements of a scan line are successively deposited under incrementing addresses of the memory.

The engraving occurs such that the picture element information, again proceeding from an engraving line start which need not coincide with the image line start, are successively read out of the image line memory. In case the engraving line start does not coincide with the image line start, the read-out of the image line memory is started from that address corresponding to the engraving line start, and that part of the image line which lies preceding this starting point is read out after the end of the image line proceeding from the starting address up to the address which corresponds to the starting point. As a consequence of the variability of the memory input and output frequency, the lengths of the scan and engraving lines can be equalized, whereby it is guaranteed that there is no free space on the engraving cylinder between the beginning of the original and the end of the original, i.e. the picture elements of the original beginning and original end connect gap-free to one another in the engraving. A matching of pattern beginning and end with respect to avoiding a visible seam is thus not yet established.

In the present invention, the scan original is retouched such that the repeat beginning and the repeat end in the pattern optimally coincide, whereby the original is longer than the pattern repeat to be transmitted. The image signals that are acquired by scanning that part of the original proceeding beyond the pattern repeat are mixed with the image signals acquired by scanning the beginning of the original. They are mixed in a mixing region for generating a steady transition between the signal level at the beginning of the pattern repeat and the signal level at the end of the pattern repeat. The mixing of such signals in accordance with a mixing function is disclosed, for example, in the German Pat. No. 27 08 421 which corresponds to U.S. Pat. Nos. 4,255,761 and 4,403,249, all incorporated herein.

Figure 2:
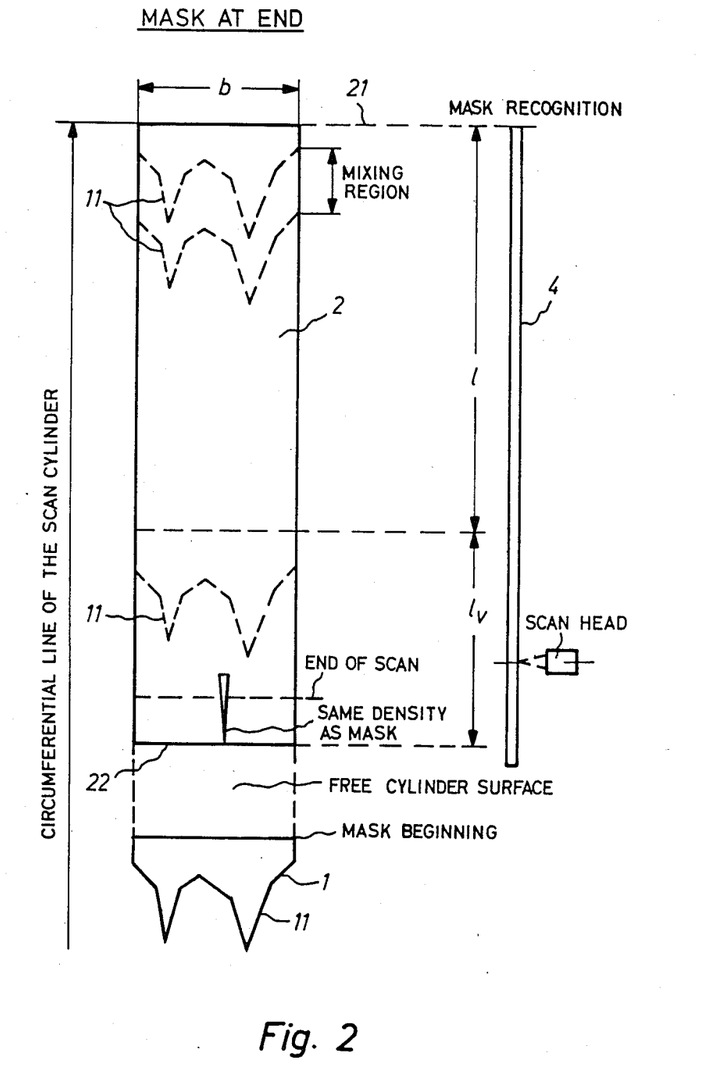
FIG. 2 is an original having a mask at the end of the original.
Figure 9:
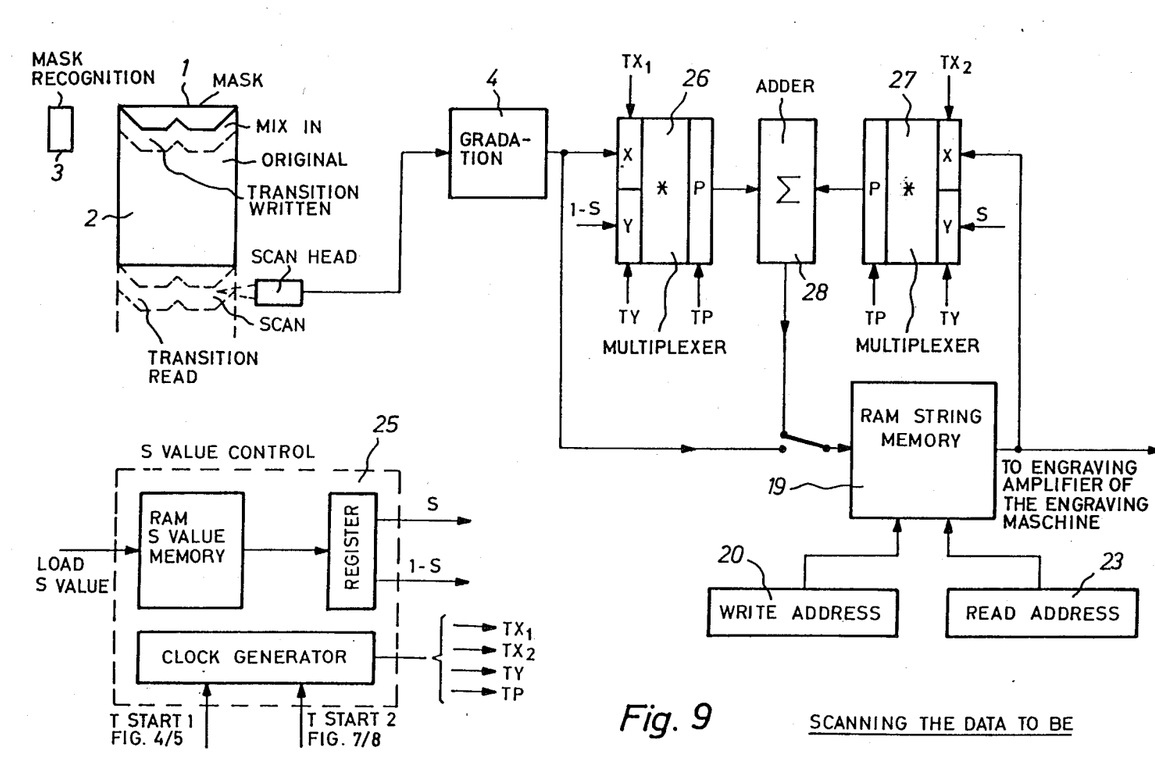
FIG. 9 is an exemplary circuit for the mixing process.

FIG. 9 of this patent shows a corresponding circuit for the signal mixing, and the mixing process itself is shown in FIG. 2. The length of the mixing region is advantageously prescribed in the present invention and is not defined by the diameter of a diaphragm scanning the transition as in the German Pat. No. 27 08 421. There the scan signals of the original, i.e. the entire pattern with pattern extension are intermediately stored picture-line-wise in accordance with the German Pat. No. 25 08 734, and the signal mixing can be undertaken without further effort by the circuit specified in FIG. 9 of German Pat. No. 27 08 421.

As already initially mentioned, the seam can still be seen in the finished print given mixing of the scan signals of the original extension with the signals of the original beginning, since the mixing region always returns at the same point of the original, even when the original has been carefully retouched. In order to avoid this, it is additionally proposed in the present invention to shift the beginning of the mixing region from image line to image line, for which purpose a corresponding serrated mask is additionally scanned, whereby the "pattern beginning" is differently fixed in a longitudinal direction of the pattern from image line to image line, i.e. from scan line to scan line.

Figure 1:
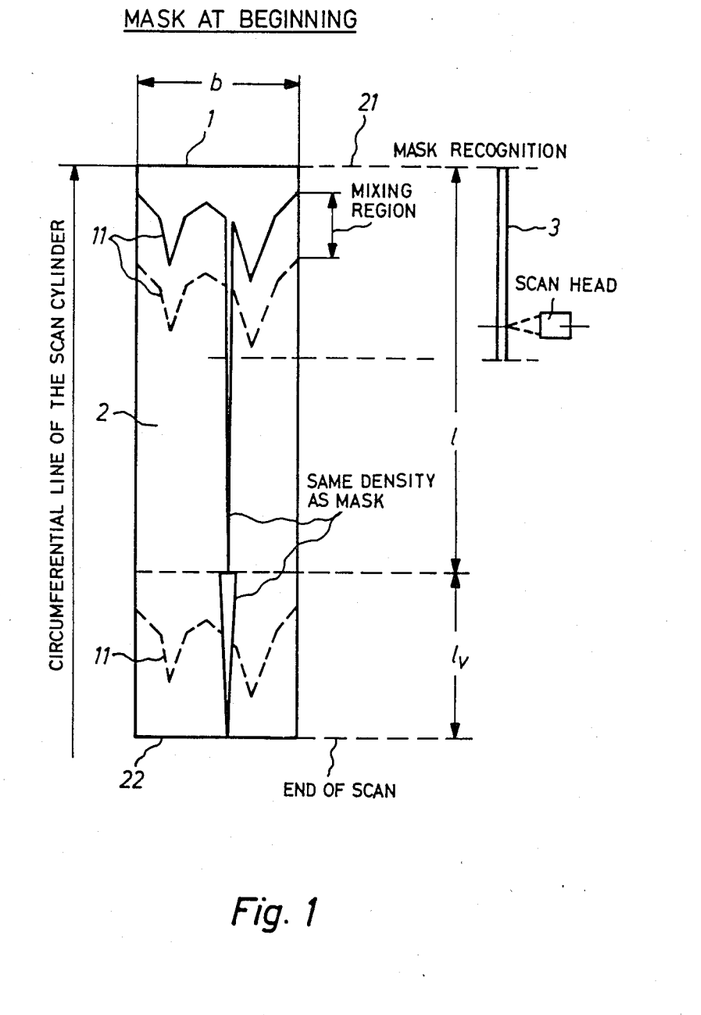
FIG. 1 is an original having a mask at the beginning of the original.

FIG. 1 shows such a mask 1 which is mounted at the beginning of a pattern original 2. The original 2 is mounted in a circumferential direction on the scan cylinder (not shown) of the engraving machine and has an overall length from the beginning 21 to the end 22 of the original which is composed of the actual pattern length L and the length of the original extension $l_v$. Let the width b of the original be constant over its entire length $1 + l_v$. The mask 1 has a contour 11 which, as seen across the width b of the original, is uneven-lined, whereby the serrated contour can be advantageously matched to the most favorable seam path at the pattern beginning or end when generating the mask.

The function of the mask scanning in conjunction with the original scanning is as follows.

The scan element of the engraving machine first scans the mask 1 on every image line. A mask contour line 11 begins the mask scanning. The intersection of the contour line 11 with the respective scan line thus defines the beginning of the scanning of the pattern information. The end of the pattern has been reached after the length l, but the pattern beginning was not scanned up to the mask contour 11 due to the switch function of the mask. This missing pattern information is now acquired by scanning the original extension $l_v$, namely the scanning in the region $l_v$ continues to the same degree as the mask 1 had previously blanked out the beginning of the original. Expressed in other words, as much original information as corresponds to the repeat length 1 of the pattern is scanned by the mask contour line 11 for every image line.

Since the scanning according to German Pat. No. 25 08 734 proceeds along the circumferential lines of the scan cylinder and the scan image lines are stored proceeding from a scan image line start which coincides with the original beginning 21, the region of the image line memory defined by the mask is empty in the scanning of mask and original according to FIG. 1 of the present invention. Thus, the pattern data scanned over the pattern end in the region $l_v$ can be deposited into the starting region of the image line memory and are available for the mixing operation according to German Pat. No. 27 08 421 described above.

Even without the mixing operation according to German Pat. No. 27 08 421, an improvement would be achieved over German Pat. No. 16 52 340 since the change-over region for every scan line lies at a different location than in the German Pat. No. 16 52 340; however, there would only be one change-over between the two signals at the corresponding location.

Given mere application of German Pat. No. 27 08 421, however, the mixing region is too small since it is defined by the diaphragm diameter of the surrounding field diaphragm, and thus comes close to a change-over operation.

In the present invention, however, a mixing region is prescribed dependent on the pattern, this mixing region following the scan image line start which is prescribed by the mask contour. A steady transition for every individual scan line can be achieved by the above-described storage of the picture elements of the actual scanned pattern beginning and original extension proceeding beyond the repeat length. This is thus achieved by means of the mixer stage specified in FIG. 1 or FIG. 2 of German Pat. No. 27 08 421 upon prescription of the length of the mixing region.

In the mixing operation, the picture signals of the scanned region of the original extension and, proceeding from the mask contour 11, the picture signals of the actually scanned original beginning are read out from the picture line memory of the engraving machine and are mixed by means of the prescribed mixing function.

The mixing region is prescribed in that a determination is made regarding how many picture signals of the original extension should be mixed with the picture signals of the actually scanned pattern beginning.

In the example shown in FIG. 1, the mask is arranged at the beginning of the original, or the original can be correspondingly blackened so that this region of the original acts as a mask.

FIG. 2 shows a modification wherein the mask 1 is disposed on the free region of the scan cylinder between original beginning and original end. When scanning a circumferential line of the scan cylinder, the mask beginning is likewise recognized and the length of the mask up to the mask contour line 11 is identified by the scan element and stored. When, after the original scan on a circumferential line, the scan element now proceeds into the original beginning, then, on the basis of the respective mask lengths of the individual scan image lines, the same number of original starting points as the respective mask length are suppressed.

Only now does the actual pattern scanning, i.e. the image line start, begin. The subsequent execution is the same as in FIG. 1.

It can then occur in the example of FIG. 1 that densities in the pattern which are identical to the mask itself occur in the region of the pattern adjoining the mask, these then also appearing in the original extension due to the repeatability of the original. It would thus not be possible to define the real beginning of the original scanning by the mask contour 11; this described mixing principle thus would not function, or would only function with errors.

In order to prevent this, it is also provided that a mask recognition be undertaken at the edge of the mask or original, this mask recognition being composed, for example, of a bar 3 which is scanned in a separate scan event preceding the actual mask and original scanning and thus defines a region which the mask can assume as a maximum. The signals scanned subsequent thereto are identified as pattern signals; the signals that are scanned before the end of the mask recognition are identified as mask signals; the signals that have been scanned before the end of the mask recognition are identified as pattern signals when the mask contour 11 has been previously crossed and the density differs from the density of the bar scanned as a mask recognition or a mask density prescribed for and allocated to this mask recognition.

When the original density is equal to the mask density, then the scan signal is interpreted as a mask signal for the same length as the maximum length of the mask control.

In the example of FIG. 2, it can occur that the original is longer than the pattern and the pattern extension together, particularly when a second, identical pattern is chucked for the pattern extension. When identical gradation values then occur in the region of the second pattern following the mask extension as in the mask itself, then these would be perceived and interpreted as mask signals. In order to prevent this, a mask recognition is likewise employed in this case. Two possibilities are provided. As in FIG. 1, the mask recognition can be positioned next to the mask as bar 3, or a mask recognition in the form of a bar 4 or in the form of corresponding marks is applied to the original. Advantageously, the length of the bars 4 then extends from the beginning of the original up to the end of the second pattern repeat. In this case, too, a clear separation between original scan signal and mask signal is possible, even if the same density occurs in the original as in the mask adjoining thereto.

Of course, it is also possible to work with two scan heads. In this case, the mask is chucked next to the original and both the mask as well as the original have a respective scan head allocated to them, so that these signals arise at separate lines and can be then employed in the above-described fashion for the mixing operation.

Figure 3:
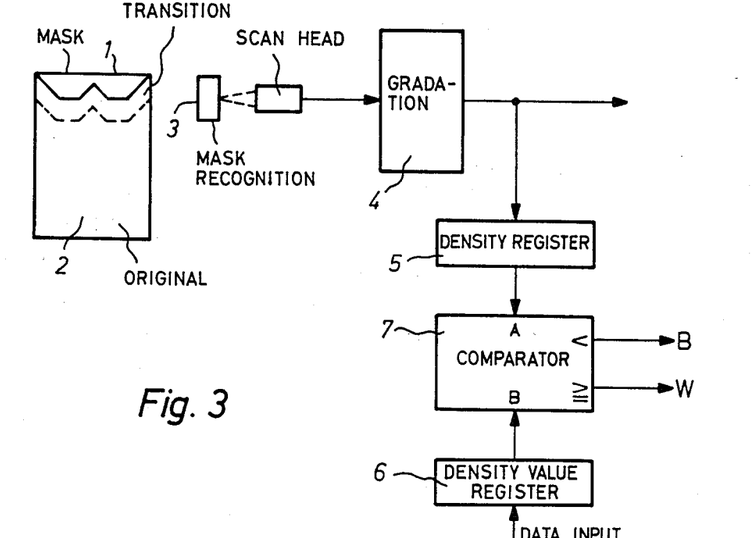
FIG. 3 is an example of a circuit for mask recognition.

FIG. 3 shows an exemplary circuit for scanning the mask recognition 3 of FIG. 1 and for identifying whether black values or white values are being seen.

At the beginning of the scan, the mask recognition is scanned by means of the scan head in order to identify the length of the mask recognition. The signals of the scan head proceed via a gradation stage 4 to a register 5. The register 5 is, for example, designed as module SN 74 273 of Texas Instruments.

A density value register 6 is also provided in which a density comparison value is deposited with which the densities A which are written into the density register 5 by the scan head via the gradation stage 4 are compared by means of comparator 7 to the density value B which is deposited in the density value register 6. When the densities A supplied by the scan head are lower than the density value B, then this value is recognized as black, and is output on the line S.

When the density value A from the scan head is equal to or greater than the density value B in the density value memory 6, then this is a white value which is output on the line W.

Black thus encompasses a defined density spectrum and excludes white values which may potentially have been scattered in.

The module SN 7485 or NS74LS686 of Texas Instruments can be employed, for example, as comparator 7 and module SN 74 273 of Texas Instruments can be employed as density value register 6.

Figure 4:
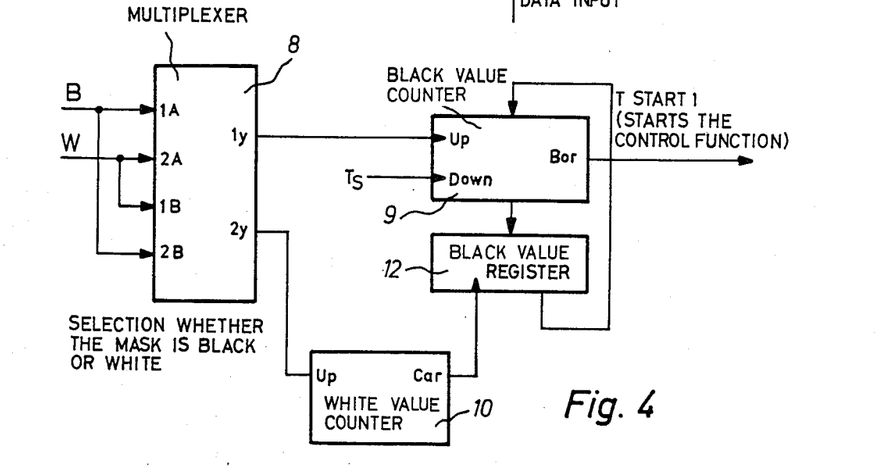
FIG. 4 is an exemplary circuit for the identification of the length of the mask recognition.

FIG. 4 shows a circuit means for identifying the length of a mask recognition 3. The black or white values supplied by the comparator 7 of FIG. 3 are selected via a multiplexer 8. The mask color, whether black or white, can thus be identified. The mask recognition 3 thus is not bound to a specific color. The black values are counted into a black value counter 9. When the mask recognition 3 is at an end, then nonblack values are recognized by the comparator 7 and these are counted into a white value counter 10. When the counter 10 is filled, then the content of the black value counter 9 is written into a black value register 12.

With every image line start, the content of the black value register 12 is loaded into the black value counter 9 during the scanning and is counted back from the scan line start with a clock $T_S$. When the counter reading is 0, then a pulse is output at the output of the black value counter 9 which serves as a start signal for the control function of the mixing operation.

The following components can be employed in the circuit of FIG. 4.

| Multiplexer 8 | SN 74158 |
| White Value Counter 10 | SN 74193 |
| Black Value Counter 9 | SN 74193 |
| Black/White Value Register 12 | SN 74273 |

All of the above are manufactured by Texas Instruments.

Figure 5:
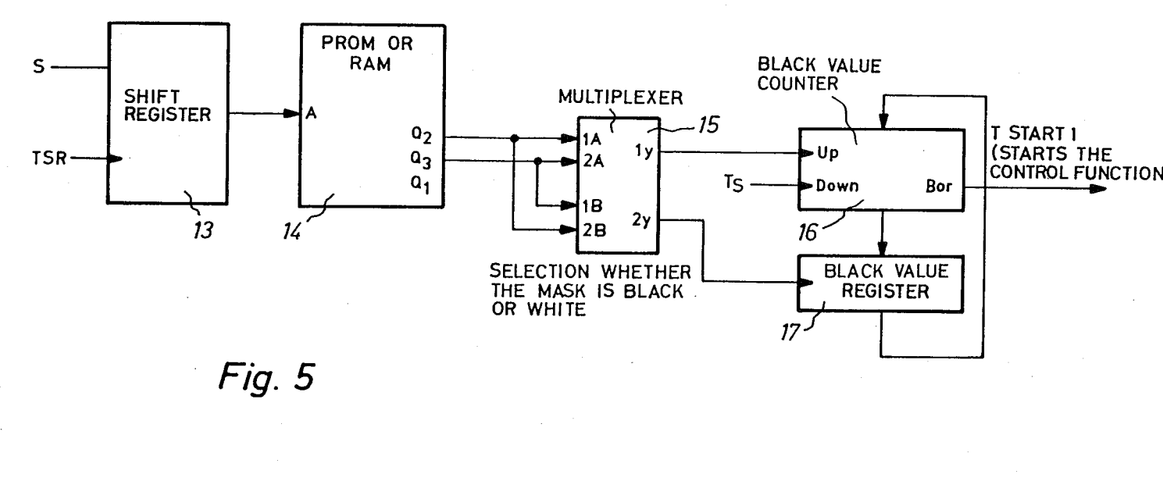
FIG. 5 is a further embodiment for the identification of the length of the mask recognition.

FIG. 5 shows a further circuit arrangement for identifying the length of the mask control 3 which is less sensitive to the in-scatter of white values than the circuit arrangement of FIG. 4. The black value S from comparator 7 is shifted in a shift register 13. An H denotes black and, by contrast an L denotes non-black. Only a specific number of H values in the shift register 13 are recognized as black, in contrast whereto only a specific number of L-values is recognized as non-black.

After every shift clock, the output signal of the shift register is adjacent to a PROM or RAM 14 as an address; the signals $Q_1$, $Q_2$ and $Q_3$ are read from the PROM or RAM memory under these addresses.

The recognition of black or white thus does not depend on a single bit, but rather the individual bits are combined into longer words for black/white recognition. The output signals $Q_2$ and $Q_3$ of the memory 14 are the values for black and white composed of the individual bits.

The mask color can again be selected by a multiplexer 15. The black values appearing at the output ly of the multiplexer 15 are counted into a black value counter 16. Given a pulse at the output 26 of the multiplexer 15, the content of the black value counter is forwarded into a black value register 17 and, as in FIG. 4, is counted down with a clock $T_S$. When the counter reading is 0, then a pulse appears at the output of the black/white value counter 16 which serves as a start signal for the control function of the mixing operation.

The following, commercially available integrated circuits can be employed as components for the circuit arrangement of FIG. 5.

| Shift Register 13 | SN 74164 |
| PROM 14 | SN 74S472 |
| Multiplexer 15 | SN 74158 |
| Black Value Counter 16 | SN 74193 |
| Black Value Register 17 | SN 74273 |

All of the above are manufactured by Texas Instruments.

Figure 6:
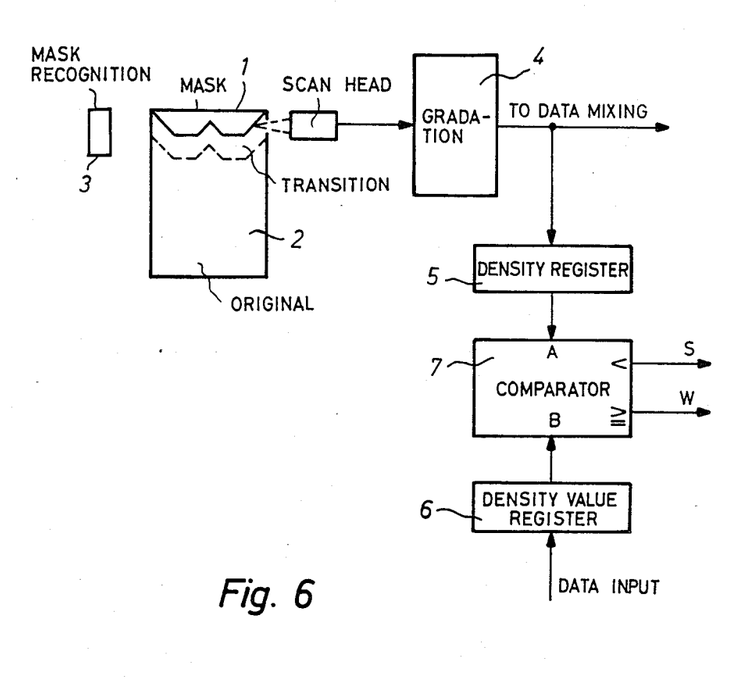
FIG. 6 is an exemplary circuit for the mask scanning.

FIG. 6 shows a circuit arrangement for scanning the mask and for determining whether black or white values are being seen by the scan head. The scan head scans the actual mask 1 instead of the mask recognition in FIG. 3. The further course of the identification, whether black or white is being perceived, corresponds to that of FIG. 3, for which reason the same circuit and the same components are employed in FIG. 6 as in FIG. 3. In order to avoid repetition, the sequence shall not be described again, since it is identical to that of FIG. 3.

Figure 7:
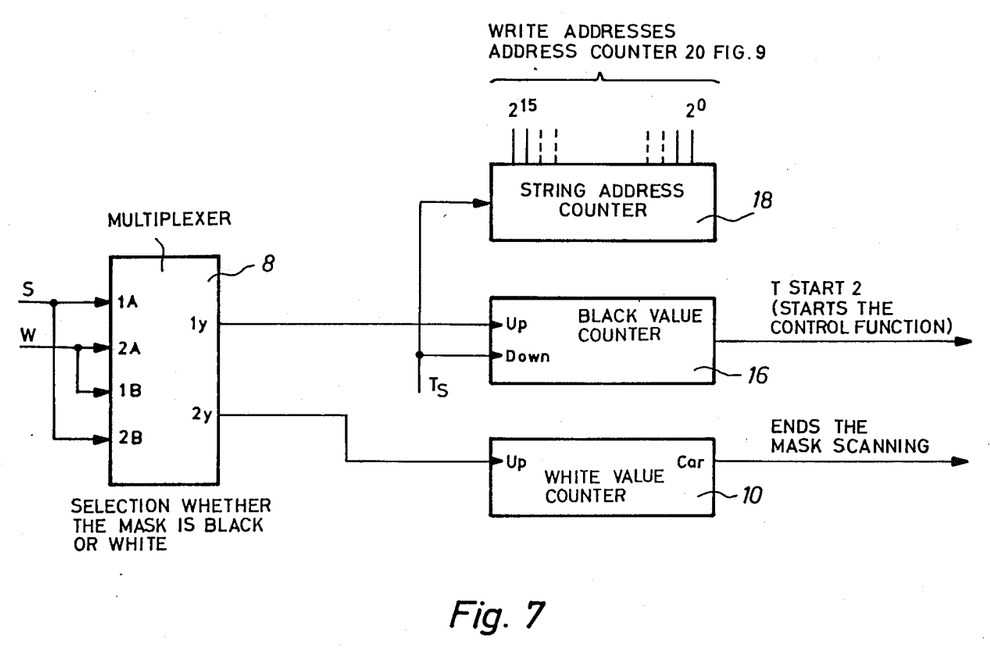
FIG. 7 is an exemplary circuit for identifying the mask length.

FIG. 7 shows a further circuit arrangement for identifying the length of the mask. Essentially the same circuit as in FIG. 4 comprising a multiplexer 8, a black value counter 16 and a white value counter 10 is employed, whereby, differing from FIG. 4, the black value register 12 is not present. The black or white values supplied by the comparator 7 of FIG. 6 are selected via the multiplexer 8.

The mask color, whether black or white, can thereby be identified. The mask thus is not bound to a specific color. The black/white values which appear at the output ly of the multiplexer 8 are counted into the black value counter 16. When the mask 1 is at an end, then non-black values are perceived by the comparator 7 and are counted into the white value counter 10.

When a specific number of white signals W comes from the multiplexer 8, then the counter is counted down and it emits a signal that the mask scanning is over.

The black value counter 16 is counted down by a clock $T_S$ which runs at the beginning of an image line (scan image line start ABS). This clock is also forwarded to a string address counter 18 whose counter reading is interpreted as an address. A value which specifies the length of the transition is internally added to this address in the string address counter. The sum then indicates the respective higher string address. At the end of a normal scan line, the counter 16 is counted down to 0 and its output signal provides the start for the control function of the mixing operation.

The following components can be advantageously applied for the circuit:

| Multiplexer 8 | SN 74 158 |
| Black Value Counter 16 | SN 74 193 |
| White Value Counter 10 | SN 74 193 |
| String Address Counter | SN 74 193 |

Figures 8, 8A:
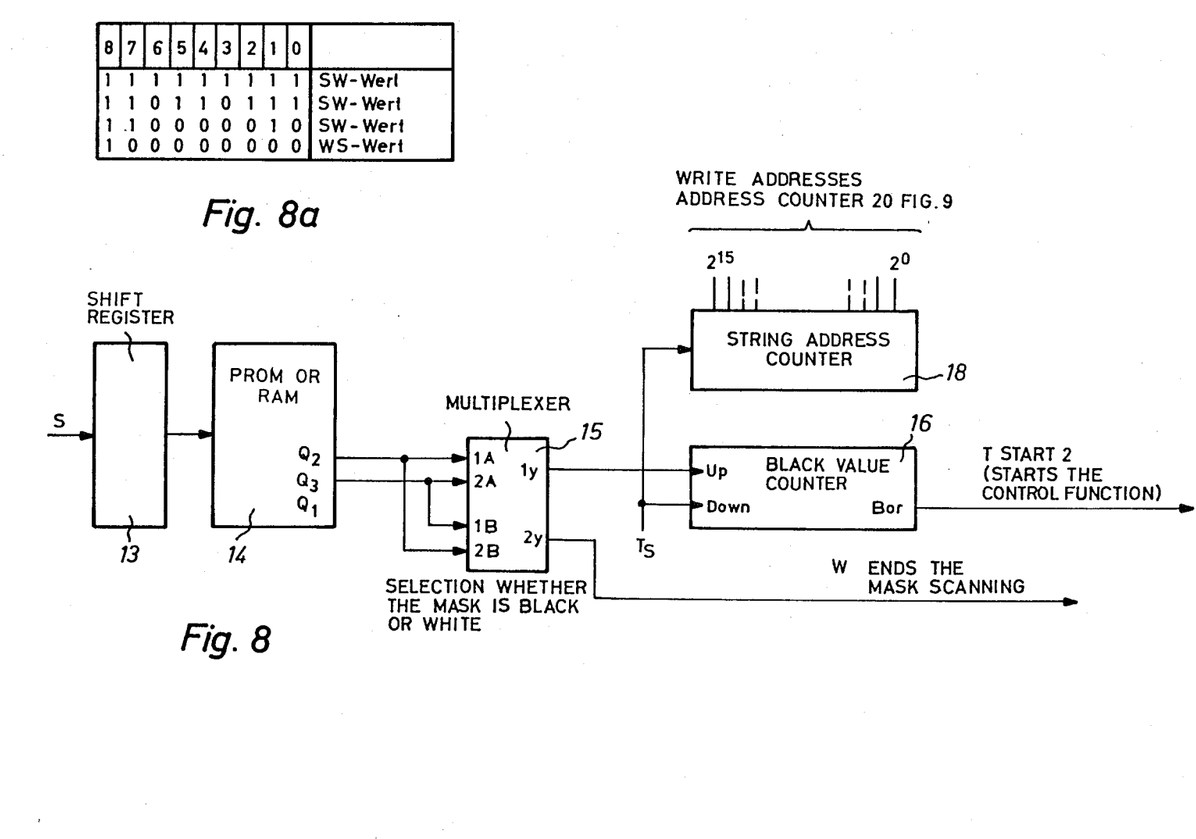
FIG. 8 is a further example for the identification of the mask length.
FIG. 8a is an example of recognition patterns.

FIG. 8 shows a further circuit for the recognition of the mask length. The black signal from the comparator 7 of FIG. 6 is forwarded into a shift register 13 which, for example, is 9 bits deep. The shift register 13 can, for example, be composed of an 8 bit shift register which is followed by a flip-flop for the 9th position.

The selection whether the mask is black or white is undertaken by means of a multiplexer 15 which is connected to a PROM or RAM 11.

FIG. 8a shows an example of recognition patterns as are deposited, for example, in the PROM or RAM 11. This is recognized as a black or as a white value depending on the adjacent image combination. When a white signal has been recognized, this is forwarded onto a line W via a multiplexer 15, whereby this signal, as in FIG. 7, then ends the mask scanning. The black value is forwarded from the output ly of the multiplexer 15 to a black value counter 16 to which a string address counter 18 is connected in parallel, as in FIG. 7. The address counting occurs in the same fashion as in FIG. 7, for which reason a repeated description thereof is omitted in order to avoid repetitions. The output signal of the black value counter 16 is likewise employed for initiating the mixing operation.

The same components are employed in FIG. 8 except for the following:

| Shift Register 13 | SN 74 164 |
| PROM 11 | TPB 28S42 |

Both of the above are manufactured by Texas Instruments.

FIG. 9 shows the actual mixing circuit as specified, for example, in FIG. 1 of German Pat. No. 27 08 421. In the example of FIG. 9, only one scan head is utilized, whereby the second scan head is replaced by a string line memory 19. The string line memory 19 comprises a write address counter 20 and a read address counter 23 by means of which the addresses required for writing and reading are acquired and are applied to the memory. The function of the mixing circuit is as follows. In the transition region of the originals, the densities which the scan head sees and which are already deposited in the string line memory are mixed, namely according to a control function "S" and "1−S". The S-values are deposited in a S-value memory 24, these S-values changing from datum to datum so that the address of the S-value memory 24 is modified with each datum.

The S-value control is started with the clocks T-start 1 and T-start 2. The S-value controller 25 also supplies the corresponding complements 1−S for the S-values as well as the clocks for the multipliers 26 and 27. In detail, these are the clocks $TX_1$, $TX_2$, $T_y$, $T_p$ shown in detail in FIGS. 10 and 11 as a clock pattern.

The mixing operation is executed such that the string line memory 19 is read and its content is written into the X-register of the multiplier 27 with the clock $TX_2$. Independently thereof, the S-value controller 25 supplies the control function S and its complement 1−S which is written into the Y-register of the two multipliers 26 and 27 with the clocks $T_y$.

The density supplied by the scan head is written into the X-register of the multiplier 26. The S-controller 25 now supplies the clock TP, and thus the multiplication appears in the two P-registers of both multipliers 26 and 27. The multiplier 26 has multiplied the density coming from the scan head by the value 1−S and the multipler has multiplied the stored value from the string memory by the value S. In the following adders 28, the two products are added up and are written into the string line memory under the still-pending address.

The output signal then proceeds to the engraving amplifier of the engraving system which is not shown in detail here. The following integrated circuits can be advantageously employed as components for the circuit of FIG. 9.

| Multipliers 26 and 27 of TRW LSI Products | MPY8 HUJ1 |
| Adder 28 | SN 7483 |
| S-Value Register | SN 74175 |
| RAM for S-Value | SN 82S212 |

All of the above are manufactured by Signetics.

Figure 10:
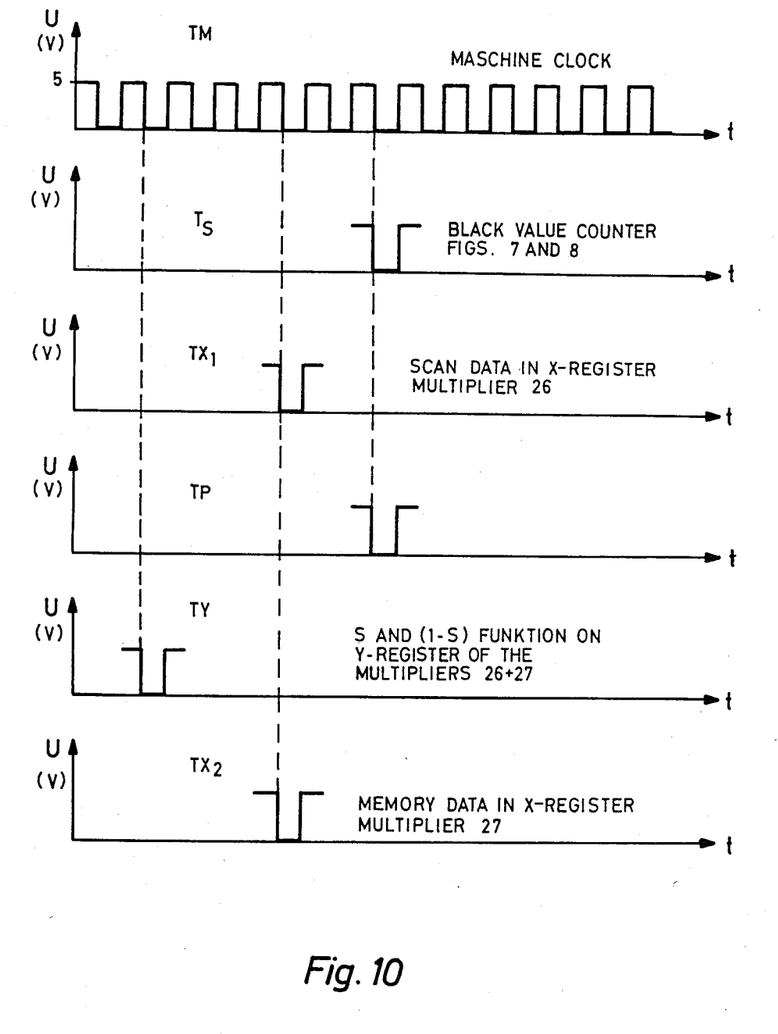
FIG. 10 shows clock patterns for the implementation of the invention.

FIGS. 10 and 11 show the clock patterns with which the mixing operation is executed. A compilation and description of the individual clock symbols is provided below.

| TM | = | Machine Clock |
| $T_S$ | = | Counting Clock for the Black Value Counter |
| TX1 | = | Transfer clock for the information of the scan head into the X-register of the multiplier |
| TP | = | Transfer Clock of the product X-Y into the output register of multiplier |
| TY | = | Transfer clock of the S-function into the Y-register of the multiplier |
| TX2 | = | Transfer clock of the read memory data into the X-register of the second multiplier. |

Although various minor changes and modifications might be proposed by those skilled in the art, it will be understood that I wish to include within the claims of the patent warranted hereon all such changes and modifications as reasonably come within my contribution to the art.

We claim as our invention:

1. A method for production of a printing cylinder for seamless or endless patterns by printing form engraving machines having a scan cylinder and an engraving cylinder, a pattern original on said scan cylinder being opto-electronically scanned picture-element-wise along scan lines lying next to one another which proceed in a circumferential direction of said scan cylinder, and every scan line supplying information for an engraving line of a pattern repeat to be transferred onto the printing cylinder, comprising the steps of:

providing the pattern original being scanned longer than the pattern repeat and scanning the pattern original longer than the pattern repeat;

mixing image signals acquired by scanning a portion of the original extending beyond the pattern repeat with image signals acquired by scanning a beginning of the original, the image signals being mixed in a prescribable mixing region for generating a steady transition between signals at a beginning of the pattern repeat and signals at an end of the pattern repeat;

shifting by different amounts starting points for scanning individual scan lines of the original at the beginning of the original in a direction of the scan lines, said shifted starting points being a beginning of the mixing region extending from the respective starting point in the circumferential direction of the scan cylinder;

providing a control mask which has a width of the original, has an uneven-lined contour graduation over its width, and has a line guidance corresponding to a most favorable seam progression;

shifting the contour graduation of said control mask relative to the beginning of the original and defining the beginning of the mixing region;

electronically scanning the mask in a same fashion as the original along scan lines lying next to one another, a signal of each and every mask scan line appearing at a contour of the mask defining the starting point of the respective scan line of the original in combination with a mask recognition signal;

proceeding from the starting point of the scan lines, scanning and storing a same number of picture elements of the original on every image line of the original as corresponds to the pattern repeat;

continuing the scanning of the original from the end of the pattern repeat for every scan line of the original into an extension of the original for a distance corresponding to a length of the mixing region, and storing picture element signals thereby acquired; and in the mixing region, combining the picture element signals of the original extension and of the beginning of the original for every scan line in accordance with a prescribed mixing function to form picture element signals having a new density information and, for engraving the printing cylinder, forming an overall repeat from the picture element signals resulting from mixing and unaltered picture element signals following thereupon from an end of the mixing region up to the end of the pattern repeat.

2. A method according to claim 1 including the step of positioning the control mask at the beginning of the original such that the mask beginning and the original beginning coincide.

3. A method according to claim 1 including the step of designing the beginning of the original itself as a mask by inking with a constant hue.

4. A method according to claim 1 including the step of positioning the control mask following the end of the original extension, the mask being positioned in a circumferential direction between the beginning and the end of the original.

5. A method according to claim 1 including the step of arranging the mask next to the original and scanning the mask by means of another scan head in addition to an original scan head.

6. A method according to claim 1 including the step of providing an identification to be scanned by a scanner preceding the mask scanning next to one of the mask or the original, acquiring a mask recognition signal and storing it by scanning said identification, and using this mask recognition signal to determine a region of a circumference of the scan drum on which the mask is situated.

7. A method for production of a printing cylinder for endless patterns by printing form engraving machines having a scan cylinder and an engraving cylinder, a pattern original on said scan cylinder being opto-electronically scanned picture-element-wise along scan lines which proceed in a circumferential direction of said scan cylinder, and the scan lines supplying information for an engraving line of a pattern repeat to be transferred onto the printing cylinder, comprising the steps of:

providing the pattern original being scanned longer than the pattern repeat and scanning the pattern original longer than the pattern repeat;

mixing image signals acquired by scanning a portion of the original extending beyond the pattern repeat with image signals acquired by scanning a beginning of the original, the image signals being mixed in a mixing region for generating a smooth transition between signals at a beginning of the pattern repeat and signals at an end of the pattern repeat;

shifting by different amounts starting points for scanning individual scan lines of the original at the beginning of the original in a direction of the scan lines, said shifted starting points being a beginning of the mixing region extending from the respective starting point in the circumferential direction of the scan cylinder;

providing a control mask which has a width corresponding to the original, which has an uneven-lined contour graduation over its width, and which has a line guidance corresponding to a desirable seam progression;

shifting the contour graduation of said control mask relative to the beginning of the original and defining the beginning of the mixing region;

electronically scanning the mask in a fashion similar to the original, a signal of each mask scan line appearing at a contour of the mask defining the starting point of the respective scan line of the original in combination with a mask recognition signal;

proceeding from the starting point of the scan lines, scanning and storing a number of picture elements of the original on every image line of the original as corresponds to the pattern repeat;

continuing the scanning of the original from the end of the pattern repeat for each scan line of the original into an extension of the original for a distance corresponding to a length of the mixing region, and storing picture element signals thereby acquired; and in the mixing region, combining the picture element signals of the original extension and of the beginning of the original for each scan line in accordance with a prescribed mixing function to form picture element signals having a new density information and, for engraving the printing cylinder, forming an overall repeat from the picture element signals resulting from mixing and unaltered picture element signals following thereupon from an end of the mixing region up to the end of the pattern repeat.

* * * * *